United States Patent
Sigrist et al.

(10) Patent No.: US 9,677,600 B2
(45) Date of Patent: Jun. 13, 2017

(54) CONNECTING ROD SYSTEM FOR AN ENGINE

(75) Inventors: John W. Sigrist, Greenfield, WI (US); Jeffrey H. Whitmore, Wauwatosa, WI (US); Elliot J. Matel, Milwaukee, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 473 days.

(21) Appl. No.: 13/281,188

(22) Filed: Oct. 25, 2011

(65) Prior Publication Data

US 2013/0098330 A1    Apr. 25, 2013

(51) Int. Cl.
*F02B 75/32* (2006.01)
*F16C 9/04* (2006.01)
*F16C 7/02* (2006.01)

(52) U.S. Cl.
CPC .............. *F16C 9/04* (2013.01); *F16C 7/023* (2013.01); *F02B 75/32* (2013.01); *F16C 2360/22* (2013.01); *Y10T 29/49288* (2015.01)

(58) Field of Classification Search
USPC .... 123/197.3, 197.4, 48 B, 78 E; 29/888.09, 29/888.051; 384/430, 216, 268, 270; 74/579 R
See application file for complete search history.

(56) References Cited

U.S. PATENT DOCUMENTS

| | | |
|---|---|---|
| 491,727 A | 2/1893 | Maloney |
| 1,151,339 A | 8/1915 | Browning |
| 2,145,864 A | 2/1939 | Denneen et al. |
| 2,553,935 A | 5/1951 | Parks et al. |
| 2,995,953 A | 8/1961 | De Fazi |
| 3,221,402 A * | 12/1965 | Lannen ........................... 29/439 |
| 3,338,113 A | 8/1967 | Camp et al. |
| 3,431,796 A | 3/1969 | Valbjorn |
| 3,889,553 A | 6/1975 | Ballheimer |
| 4,329,915 A | 5/1982 | Schulz |
| 4,422,348 A | 12/1983 | Campbell |
| 4,635,596 A | 1/1987 | Nakano et al. |
| 4,688,446 A | 8/1987 | Ishikawa |

(Continued)

FOREIGN PATENT DOCUMENTS

| | | | |
|---|---|---|---|
| DE | 241635 | 12/1986 | |
| DE | 241635 A * | 12/1986 | ................ F16C 7/02 |

(Continued)

OTHER PUBLICATIONS

Machine Translation of DD241635A1 PDF File Name: "DD241635A1_Machine_Translation.pdf".*

(Continued)

*Primary Examiner* — Hung Q Nguyen
*Assistant Examiner* — Ruben Picon-Feliciano
(74) *Attorney, Agent, or Firm* — Foley & Lardner LLP

(57) ABSTRACT

An internal combustion engine includes a piston, a crankshaft having a journal, and a connecting rod. The connecting rod includes a first end coupled to the piston and a second end coupled to the journal of the crankshaft. The second end of the connecting rod includes a bearing surface configured to interface with the journal, and further includes an open portion extending through the second end from the bearing surface to the exterior of the second end.

20 Claims, 16 Drawing Sheets

(56) References Cited

U.S. PATENT DOCUMENTS

| | | | |
|---|---|---|---|
| 5,199,318 A * | 4/1993 | Hudson | F02B 75/16 |
| | | | 123/197.3 |
| 5,524,507 A * | 6/1996 | Olmr et al. | 74/579 E |
| 5,560,333 A | 10/1996 | Genouille | |
| 5,660,086 A | 8/1997 | Carey | |
| 5,775,287 A | 7/1998 | Genouille | |
| 7,367,305 B2 | 5/2008 | Endoh et al. | |
| 8,100,048 B2 | 1/2012 | Christopher | |
| 2003/0075007 A1* | 4/2003 | Seo | 74/587 |
| 2006/0150405 A1* | 7/2006 | Heimann et al. | 29/888.01 |
| 2006/0283287 A1 | 12/2006 | Pankl | |
| 2007/0022999 A1* | 2/2007 | Nagira | F16C 3/20 |
| | | | 123/192.2 |

FOREIGN PATENT DOCUMENTS

| | | |
|---|---|---|
| DE | 693 17 215 | 10/1998 |
| DE | 100 55 037 | 6/2002 |

OTHER PUBLICATIONS

Human Translation of DD241635A1 PDF File Name: "DD241635A1_Human_Translation.pdf".*

International Search Report and Written Opinion for International Application No. PCT/US2012/059552, mail date Jan. 2, 2013, 11 pages.

International Preliminary Report on Patentability for PCT Application No. PCT/US2012/059552, mail date May 8, 2014, 9 pages.

* cited by examiner

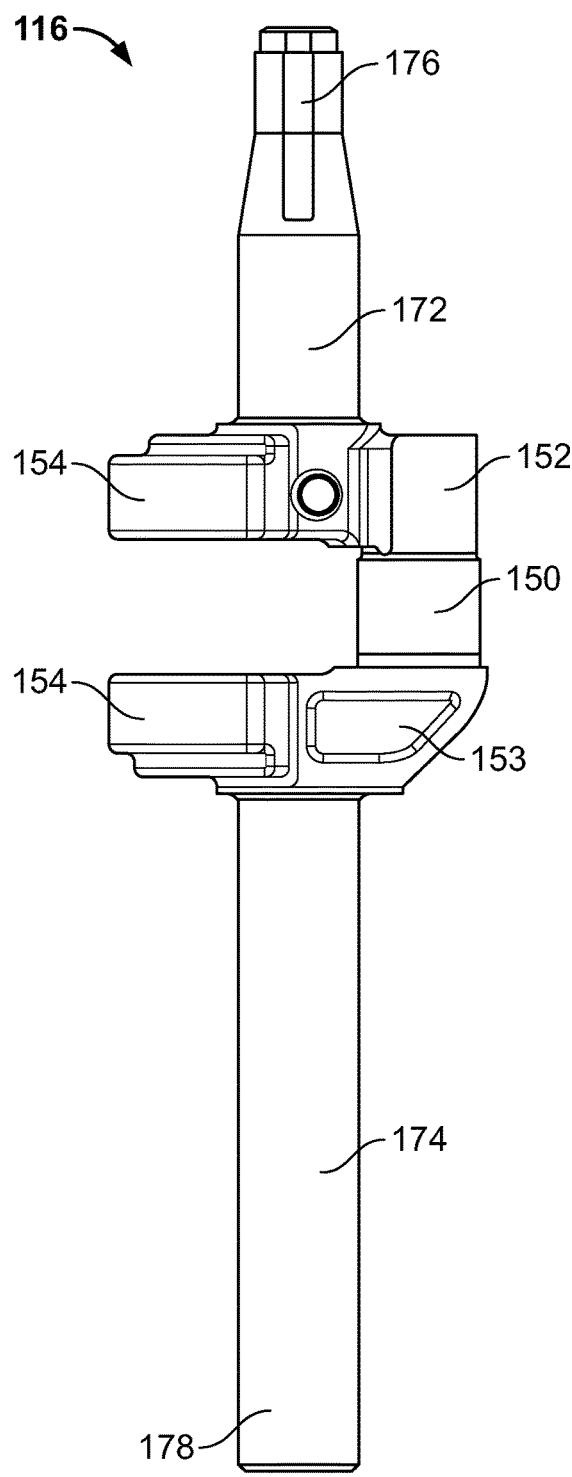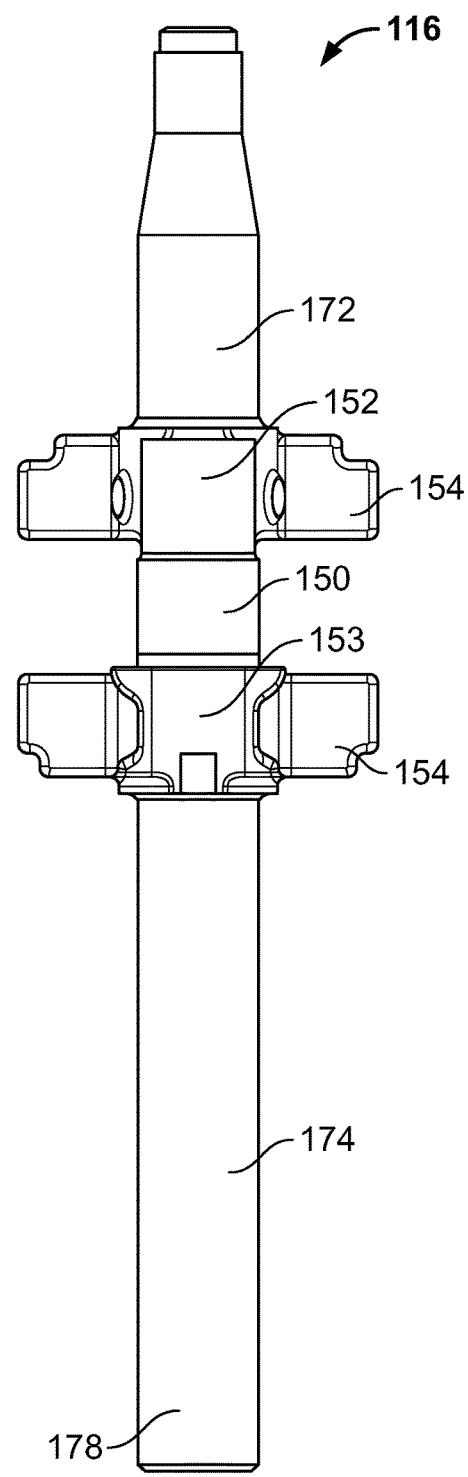
FIG. 12  FIG. 13

CONNECTING ROD SYSTEM FOR AN ENGINE

BACKGROUND

The present invention relates generally to internal combustion engines. More specifically, the present invention relates to a connecting rod configured to extend between a piston and a crankshaft of an internal combustion engine.

An internal combustion engine includes a piston driven by combustion processes of the engine. The piston is connected to a crankshaft of the engine by a connecting rod. Typically a small end of the connecting rod attaches to a pin on the underside of the piston and is able to pivot about the pin. A big end of the connecting rod attaches to a journal of the crankshaft, where the big end includes a bearing surface that interfaces with the journal. The journal is positioned laterally away from the axis of rotation of the crankshaft by webs that adjoin the journal. As the piston translates back and forth in the cylinder of the engine, due to the combustion processes, the connecting rod rotates the crankshaft via the crank throw formed by the journal and webs. Typically the crankshaft further includes a power takeoff that may be connected to a powered tool or drivetrain of outdoor power equipment.

During assembly of the internal combustion engine, the connecting rod is attached to the piston and crankshaft. A loop on the small end of the connecting rod slides onto the pin on the underside of the piston. Typically the big end of the connecting rod includes two or more parts that, when fastened together, form a closed loop that surrounds the journal. In some cases, a first portion of the big end is positioned over the journal and then a cap is bolted onto that first portion, locking the big end to the journal such that the connecting rod is held to the journal but the crankshaft is able to rotate in the closed loop with respect to the connecting rod.

The process of positioning and fastening the big end of the connecting rod to the crankshaft may be time-consuming and labor-intensive. A need exists for an efficient connecting rod system that allows for fast and accurate attachment of the connecting rod to the crankshaft during assembly of the internal combustion engine.

SUMMARY

One embodiment of the invention relates to an internal combustion engine, which includes a piston, a crankshaft having a journal, and a connecting rod. The connecting rod includes a first end coupled to the piston and a second end coupled to the journal of the crankshaft. The second end of the connecting rod includes a bearing surface configured to interface with the journal, and further includes an open portion extending through the second end from the bearing surface to the exterior of the second end.

Another embodiment of the invention relates to a connecting rod for an internal combustion engine configured to couple a piston to a crankshaft to convert translation of the piston to rotation of the crankshaft. The connecting rod includes a first end configured to be coupled to the piston, a beam connected to and extending from the first end, and a second end connected to the beam. The second end of the connecting rod includes two arms that form a bearing surface configured to interface with a cylindrical journal of the crankshaft. The bearing surface defines a circular arc of greater than 180-degrees but less than 360-degrees, such that the bearing surface includes an open portion separating the two arms. The bearing surface is configured to hold the connecting rod to the cylindrical journal of the crankshaft while allowing the crankshaft to rotate with respect to the connecting rod.

Yet another embodiment of the invention relates to a method of assembling an internal combustion engine. The method includes sliding a C-shaped end of a connecting rod longitudinally along a crankshaft, over a web of the crankshaft, such that a portion of the web moves through an open interior of the C-shaped end defined by the inside of the C-shape. The method further includes sliding a bearing surface of the C-shaped end onto a cylindrical journal adjoining the web of the crankshaft. The bearing surface of the C-shaped end extends around more than half of the perimeter of the cylindrical journal such that the C-shaped end holds the connecting rod to the cylindrical journal of the crankshaft while allowing the crankshaft to rotate with respect to the bearing surface.

Alternative exemplary embodiments relate to other features and combinations of features as may be generally recited in the claims.

BRIEF DESCRIPTION OF THE FIGURES

The disclosure will become more fully understood from the following detailed description, taken in conjunction with the accompanying figures, in which:

FIG. 12 is a side view of the crankshaft of FIG. 4.

FIG. 13 is a front view of the crankshaft of FIG. 4.

DETAILED DESCRIPTION

Before turning to the figures, which illustrate the exemplary embodiments in detail, it should be understood that the present application is not limited to the details or methodology set forth in the description or illustrated in the figures.

It should also be understood that the terminology is for the purpose of description only and should not be regarded as limiting.

Figure 1:
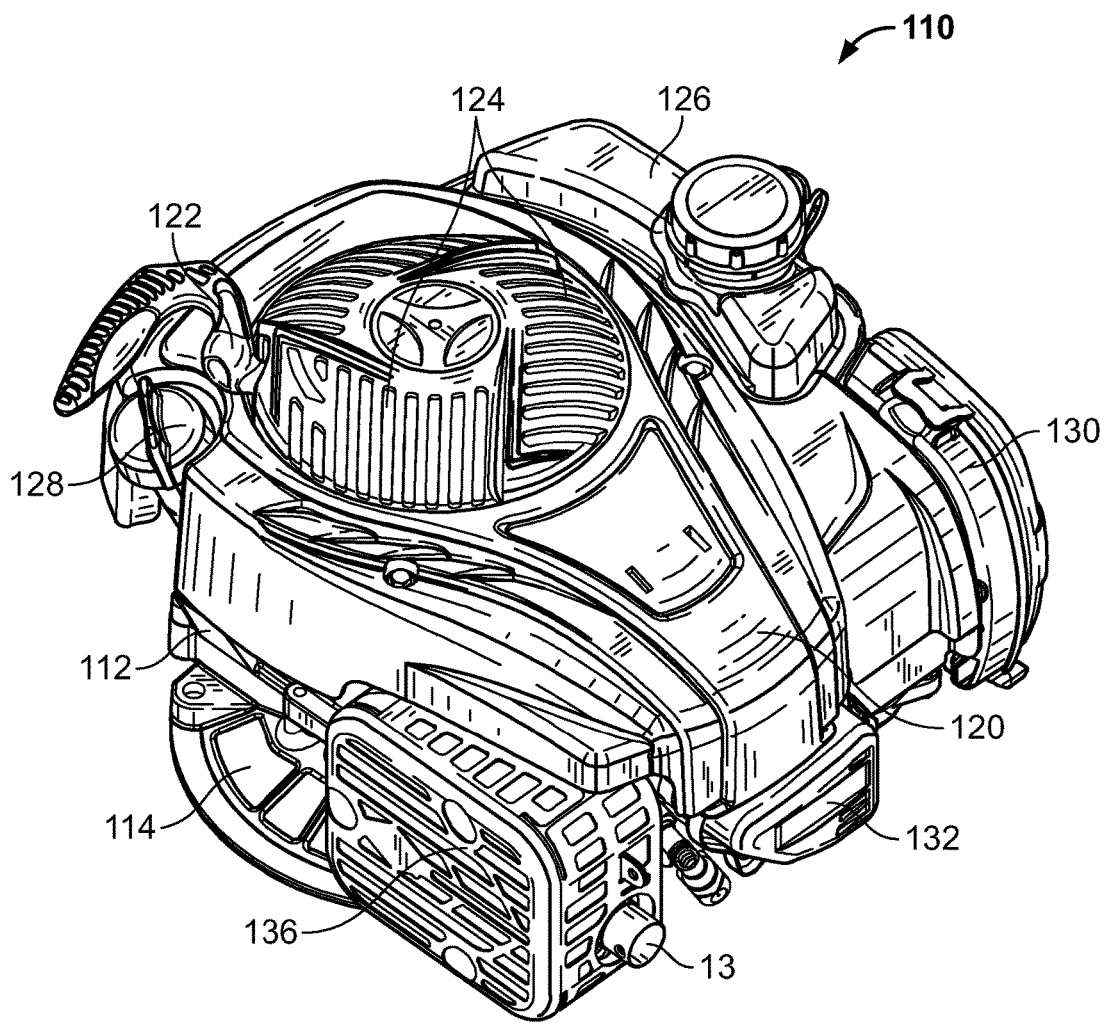
FIG. 1 is perspective view from the front of an engine according to an exemplary embodiment of the invention.
Figure 2:
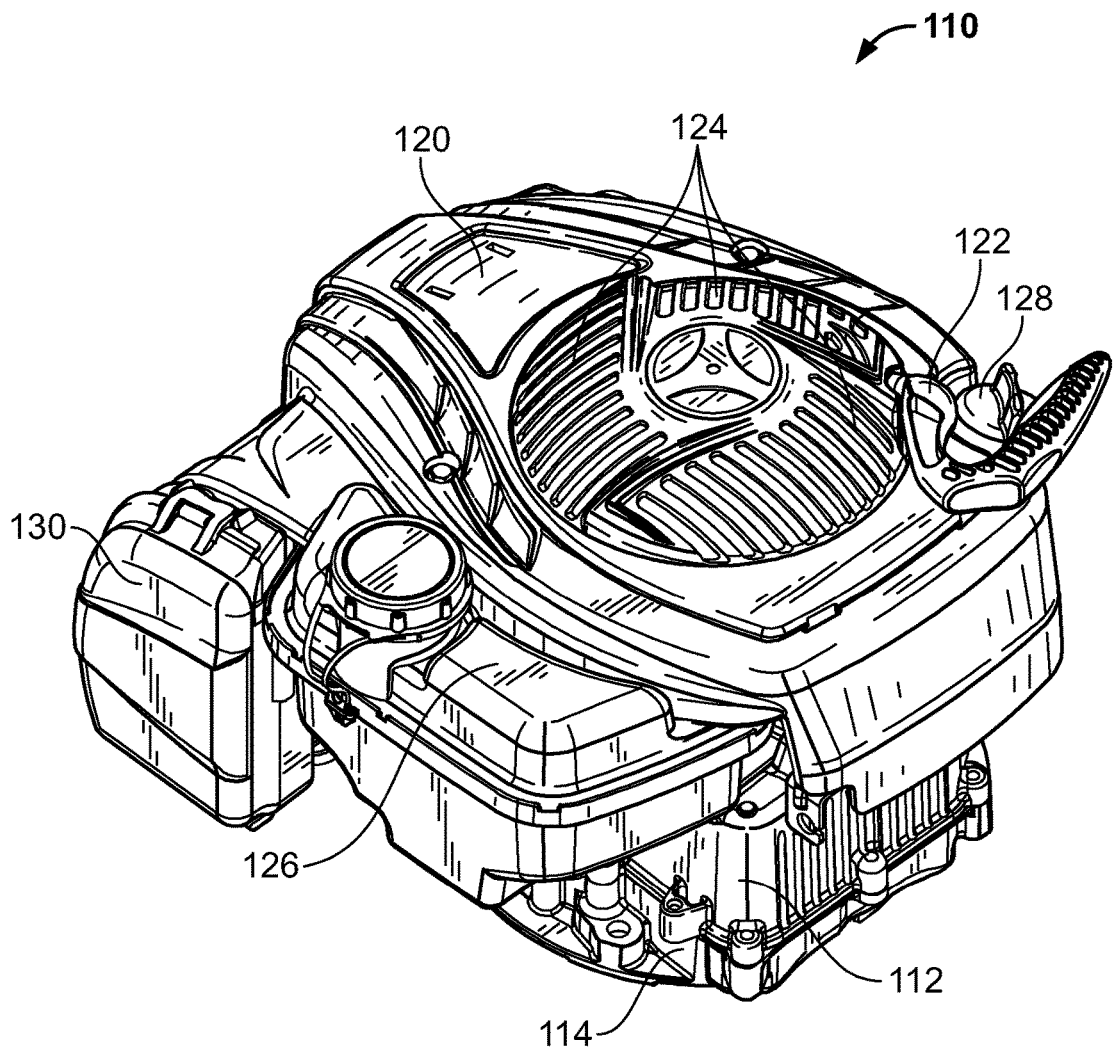
FIG. 2 is a perspective view from the rear of the engine of FIG. 1.

Referring to FIGS. 1-2, an internal combustion engine, such as a single-cylinder, vertically-shafted, four-stroke-cycle engine 110, is configured for driving outdoor power equipment, such as a walk-behind or riding lawn mower, a snow thrower, a portable generator, and a pressure washer, or for other purposes. According to an exemplary embodiment, the engine 110 includes an engine block 112 (e.g., crankcase) and a sump 114 (e.g., cover, sidewall) fastened to the underside of the engine block 112. The engine block 112 provides support for working components of the engine 110, such as a crankshaft 116 and a piston 118 (see FIG. 3). The sump 114 closes off the interior of the engine block 112 and provides a volume for collecting lubricant (e.g., motor oil) and providing the lubricant to a slinger or other distribution mechanism. In some embodiments, such as with horizontally-shafted engines, a sidewall may be fastened to an open side of an engine block instead of a sump fastened to the underside.

According to an exemplary embodiment, the engine 110 further includes a cover 120 and a recoil starter 122. Apertures 124 in the cover 120 allow air to pass to a blower fan coupled to a flywheel (not shown) fastened to an end of the crankshaft 116 (e.g., tapered end shown in FIG. 3). In some embodiments, the engine 110 includes a fuel tank 126 and an oil-fill chute 128. The fuel tank 126 is positioned proximate to an air intake assembly 130. The engine 110, shown in FIGS. 1-2, is an overhead valve engine and includes a rocker cover 132 coupled to the top of a cylinder head 134 (see FIG. 3). Exhaust of the engine 110 exits via a muffler 135, which includes a heat shield 136 in some embodiments. In contemplated embodiments, the engine may include more cylinders, may be horizontally-shafted, may use diesel fuel, may be an L-head engine or may include another valve configuration, may include additional or different engine features such as an electric starter, and may be configured for use with equipment other than outdoor power equipment.

Figure 3:
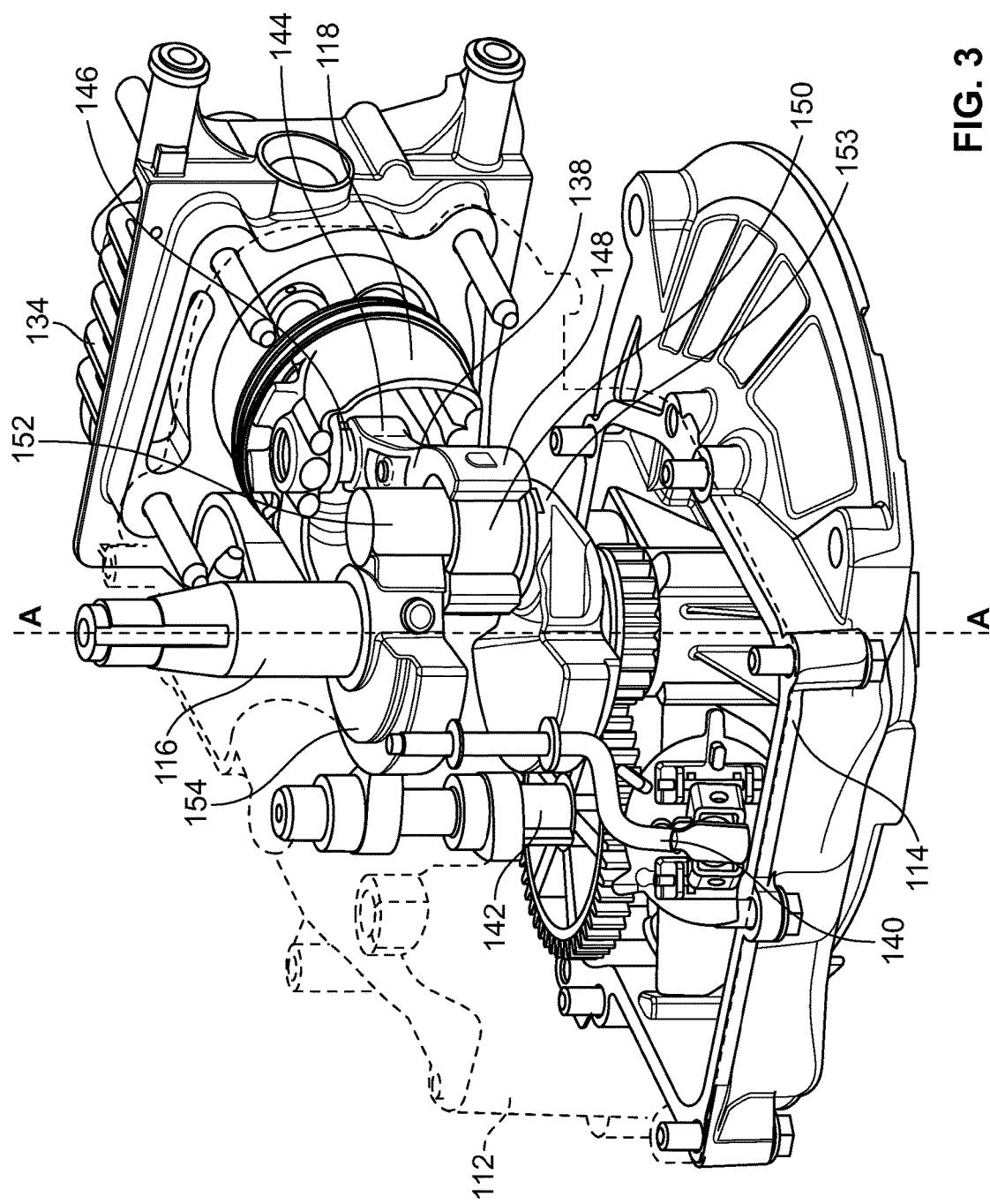
FIG. 3 is a perspective view of working components of an engine according to an exemplary embodiment of the invention.
Figure 4:
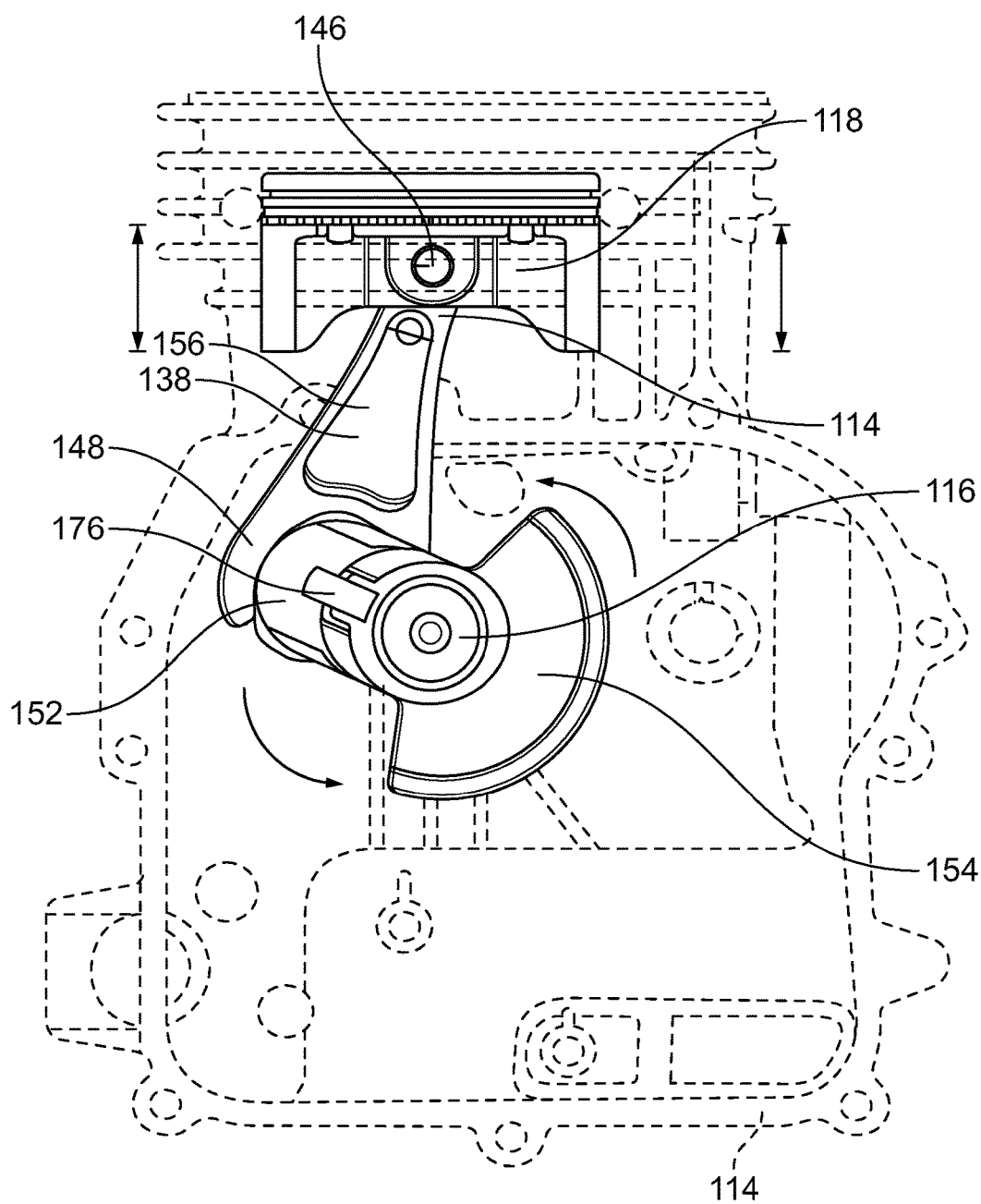
FIG. 4 is a top view of a piston, a connecting rod, and a crankshaft of the engine of FIG. 3.
Figure 5:
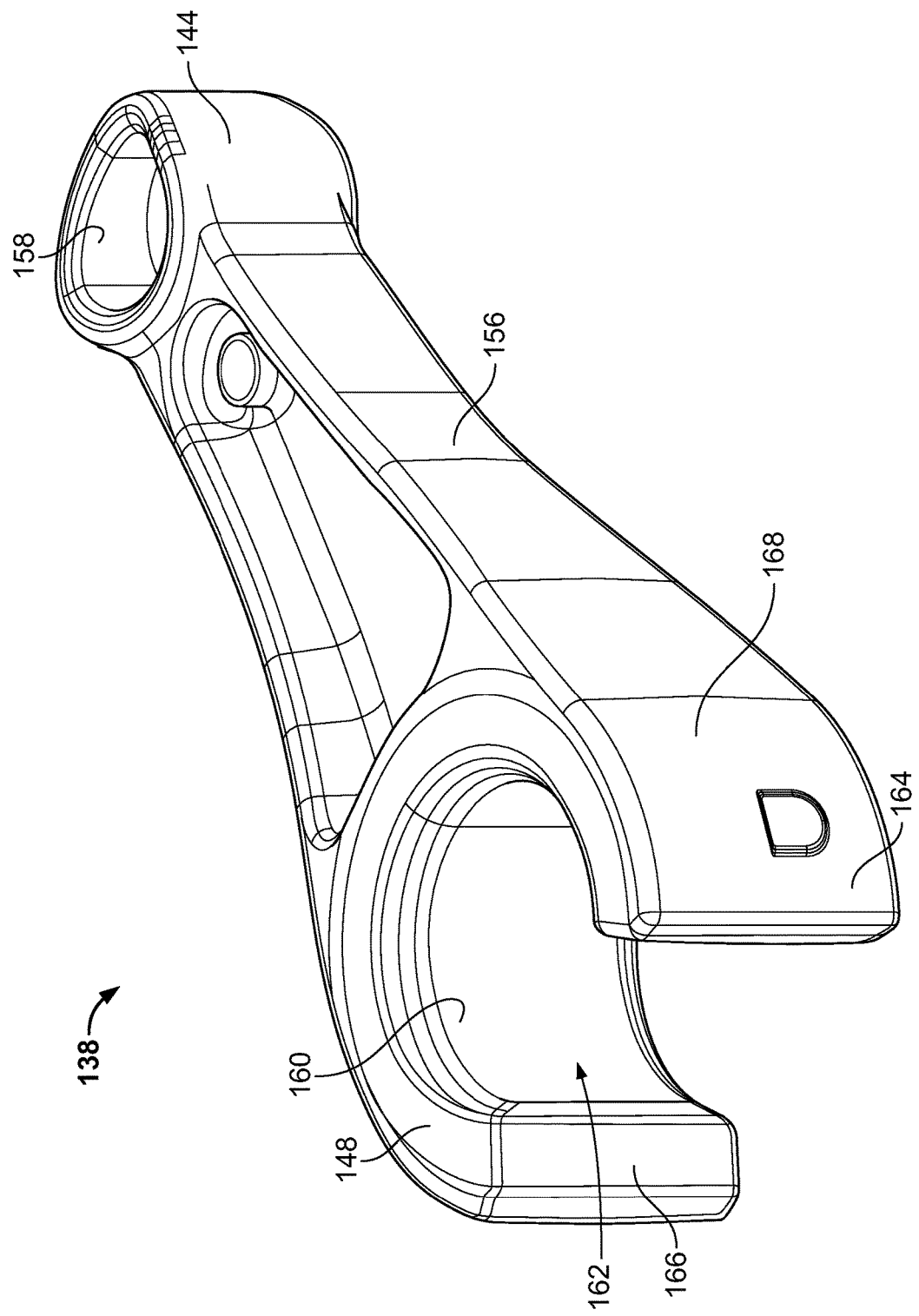
FIG. 5 is a perspective view of the connecting rod of FIG. 4.

Referring now to FIGS. 3-4, working components may be integrated with the engine 110 of FIGS. 1-2. The working components include the crankshaft 116, the piston 118, and a connecting rod 138. According to an exemplary embodiment, the connecting rod 138 couples the piston 118 to the crankshaft 116 to convert translation of the piston 118 to rotation of the crankshaft 116. In some embodiments, the working components further include a governor crank 140 fastened to the cylinder. The engine 110 may include a camshaft 142 driven by a geared connection with the crankshaft 116. In some embodiments, the camshaft 142 drives push rods (not shown) that activate rockers beneath the rocker cover 132 (FIG. 1), which in turn operates intake and exhaust valves that direct fuel and air flow through the combustion chamber, where combustion processes interact with the piston 118.

According to an exemplary embodiment, as the piston 118 translates back and forth, the connecting rod 138 rotates the crankshaft 116. A small end 144 (e.g., little end, top end, first end) of the connecting rod 138 is attached to a pin 146 (e.g., pivot, piston pin, gudgeon pin, wrist pin) on the underside of the piston 118, and a big end 148 (e.g., bottom end, second end) of the connecting rod 138 is attached to a journal 150 (see FIG. 3; e.g., big-end journal, crankpin, bearing journal) of the crankshaft 116. Despite the naming convention, the big end may not be larger than the small end in some contemplated embodiments. The journal 150 is spaced apart from the axis of rotation A-A (FIG. 3) of the crankshaft 116 by webs 152, 153. Counterweights 154, opposite to the webs 152, 153 on the crankshaft 116, reduce wobble of the crankshaft 116 as the connecting rod 138 drives the crank throw formed by the journal 150 and webs 152, 153.

Referring now to FIGS. 5-8, the connecting rod 138 includes the big end 148, the small end 144, and a beam 156 (e.g., shaft, shank, elongate connecting structure) extending between the big and small ends 148, 144. According to an exemplary embodiment, the beam 156 is an I-beam. The small end 144 of the connecting rod 138 includes a closed loop 158 (e.g., circular aperture, hole) through which extends the pin 146 beneath the piston 118.

According to an exemplary embodiment, the big end 148 of the connecting rod 138 is generally C-shaped and includes a rounded interior bearing surface 160 that does not form a closed loop. Instead, the big end 148 includes an open portion 162 that connects the bearing surface 160 on the inside of the C-shaped big end 148 to the exterior of the connecting rod 138. According to an exemplary embodiment, the open portion 162 of the big end 148 is directly opposite to the small end 144. However in other embodiments, the open portion of the big end is not opposite to the small end.

According to an exemplary embodiment, the bearing surface 160 of the big end 148 of the connecting rod 138 defines a circular arc $\beta$ (FIG. 6) having a central angle subtended by the arc of greater than 180-degrees and less than 360-degrees. In some embodiments, the central angle subtended by the circular arc $\beta$ is greater than 225-degrees. In some embodiments, the central angle subtended by the arc is less than 315-degrees. The central angle subtended by the arc is great enough that the big end 148 holds the journal 150 (FIG. 3) of the crankshaft 116 as the crankshaft 116 rotates with respect to the bearing surface 160, but small enough that the open portion 162 allows the web 152 of the crankshaft 116 to slide through the open portion 162 when the connecting rod 138 is attached to the crankshaft 116, as further discussed with regard to FIGS. 14-16. In at least one embodiment, the central angle subtended by the circular arc $\beta$ defined by the big end 148 of the connecting rod 138 is about 270-degrees.

According to an exemplary embodiment, the big end 148 of the connecting rod 138 includes two arms 164, 166 (e.g., extensions, projections, hooking portions). In some embodiments, the arms 164, 166 are symmetrically arranged about a lengthwise centerline B-B (FIG. 6) of the connecting rod 138. In other embodiments, one arm is longer than the other. The interior of the arms forms the bearing surface 160 and the open portion 162 of the big end 148 separates the arms 164, 166.

According to an exemplary embodiment, the arms 164, 166 include generally-round outside surfaces 168 (e.g., exterior, outer periphery) that extend tangentially into the outer sides 170 of the beam 156 (e.g., top and bottom of the I-beam). In some embodiments, the beam 156 extends from the outside surfaces 168 of the arms 164, 166 at an angle $\theta$ that narrows the width of the beam 156 with respect to distance from the big end 148. According to an exemplary embodiment the angle $\theta$ is less than 30-degrees and greater than 5-degrees (e.g., less than 20-degrees and greater than 10-degrees, about 15 degrees). Tangential extension of the arms 164, 166 into the beam 156 may reduce stress concentrations between the beam 156 and the big end 148 of the connecting rod 138.

According to an exemplary embodiment, the connecting rod 138 is a single, continuous, integrally-formed piece. Use of an integral piece for the connecting rod 138 is intended to reduce assembly costs, in terms of labor and time, associated with fastening together multiple parts of a connecting rod. Additionally, the integral piece may respond better to fatigue loading and vibrations associated with the engine 110 when compared to connecting rods formed from multiple parts fastened together. However, in other embodiments, threaded fasteners and multiple parts may be used.

In some embodiments, the connecting rod 138 is formed from metal (e.g., steel, aluminum, iron) via a die casting process or forging. In other embodiments, the connecting rod is molded from ceramic or another material. In still other contemplated embodiments, the connecting rod may be stamped from sheet metal, assembled from a stack of stamped metal layers, or otherwise formed.

In some embodiments, the open portion 162 of the big end 148 of the connecting rod 138 remains open during operation of the engine 110, and is not closed by a cap or another structure. The open portion 162 is too narrow for the journal 150 of the crankshaft 116 to pass through the open portion 162 under normal loading conditions of the connecting rod 138 in the engine 110. As such, the big end 148 does not include holes for bolts or other attachment structures configured to receive a cap for closing the open portion 162 of the big end 148.

Figure 9:
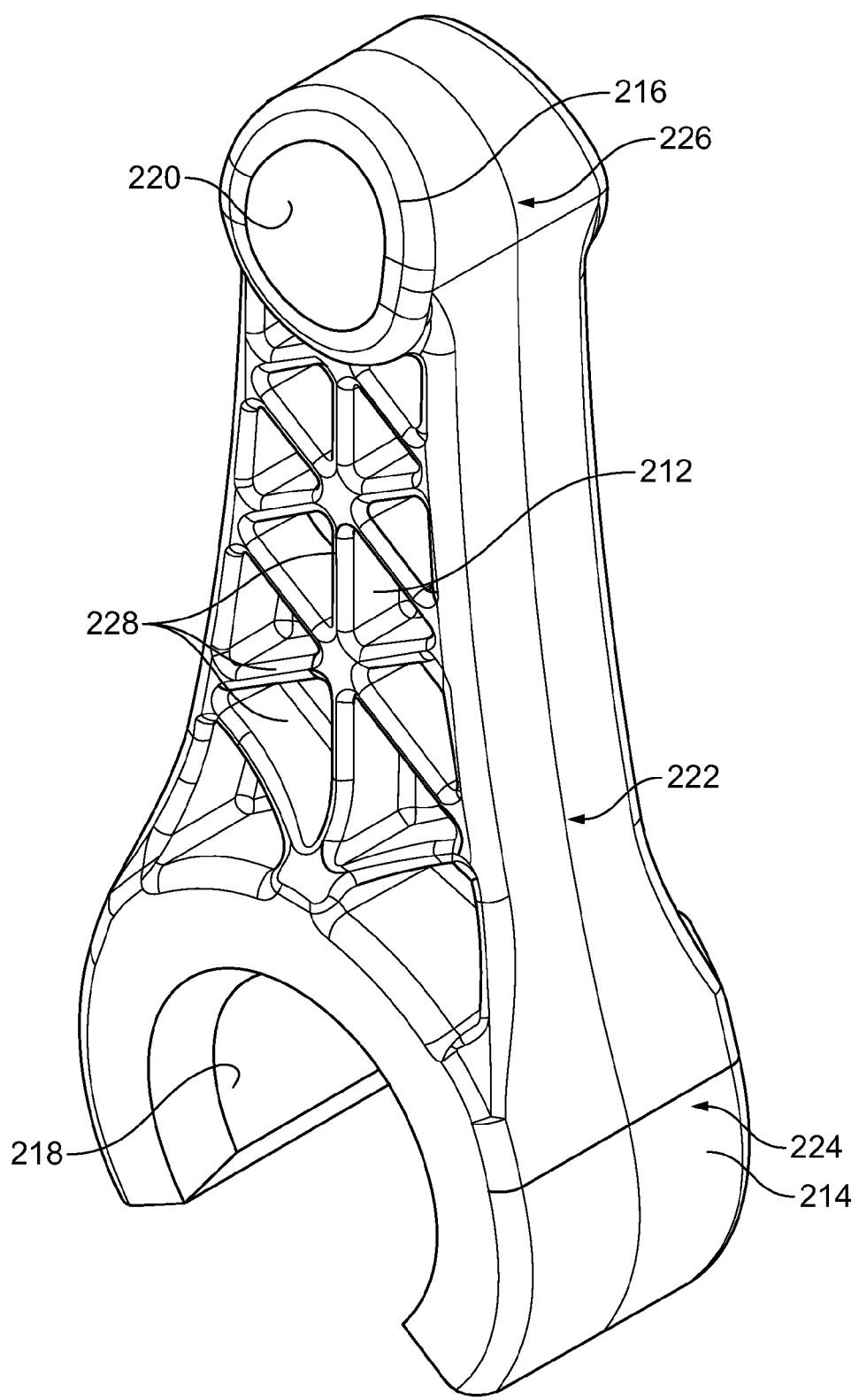
FIG. 9 is a perspective view of a connecting rod according to another exemplary embodiment of the invention.
Figure 10:
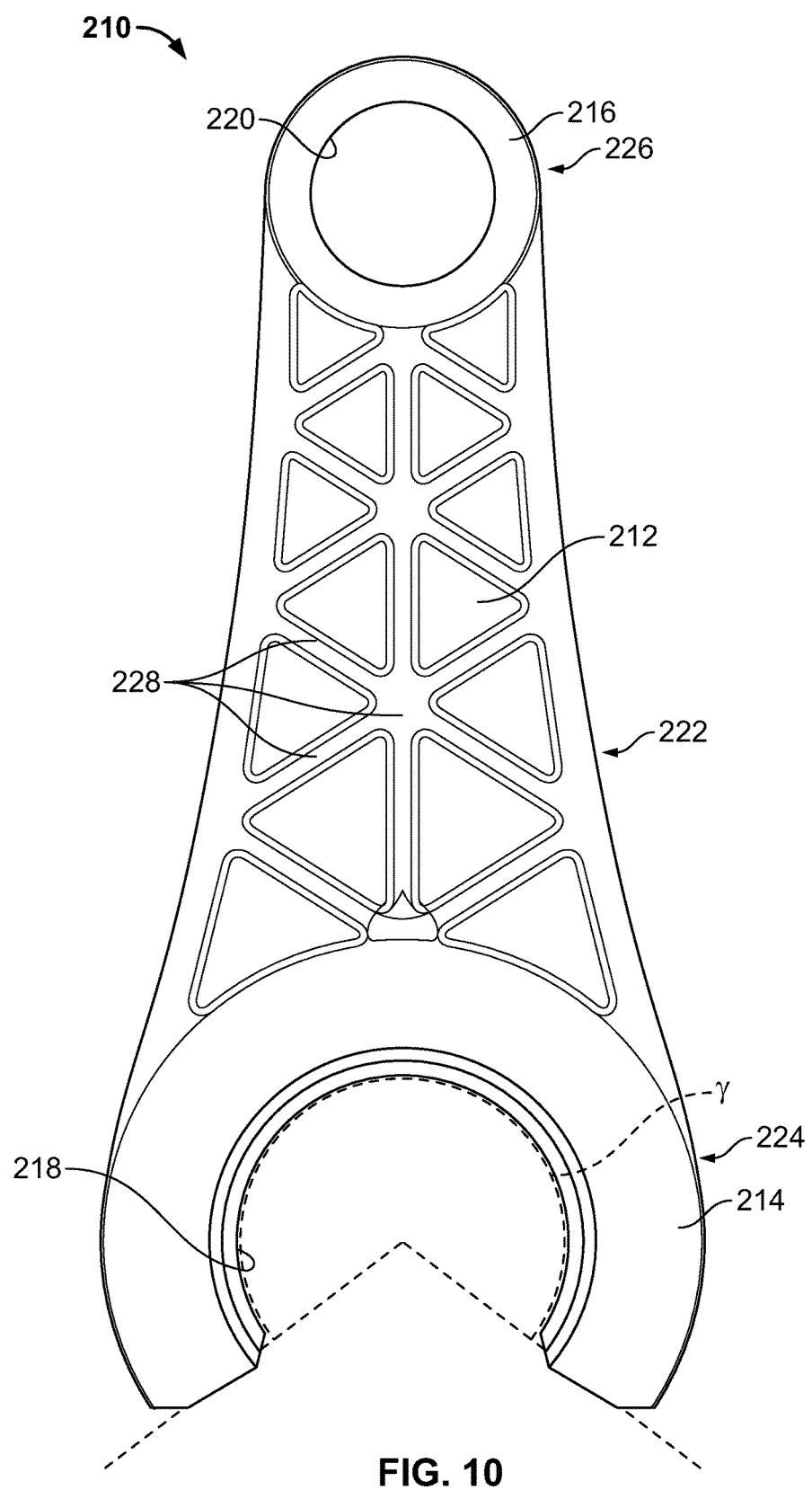
FIG. 10 is a side view of the connecting rod of FIG. 9.

Referring now to FIGS. 9-10, a connecting rod 210, according to an other exemplary embodiment, includes a beam 212 extending between a big end 214 and a small end 216. The big end 214 includes a C-shaped bearing surface 218 and the small end 216 includes a closed loop 220. Outer sides 222 of the beam 212 extend tangentially from outside surfaces 224, 226 of the big end 214 and the small end 216. According to an exemplary embodiment, the beam 212 includes a truss reinforcement structure 228 (e.g., lattice truss, Brown truss) providing added strength for the beam 212. The bearing surface 218 of the big end 214 shown in FIGS. 9-10 has a lesser central angle γ subtended by the arc (e.g., about 260-degrees) than the central angle β subtended by the arc of the bearing surface 160 of the connecting rod 138 shown in FIGS. 5-8.

Figure 11:
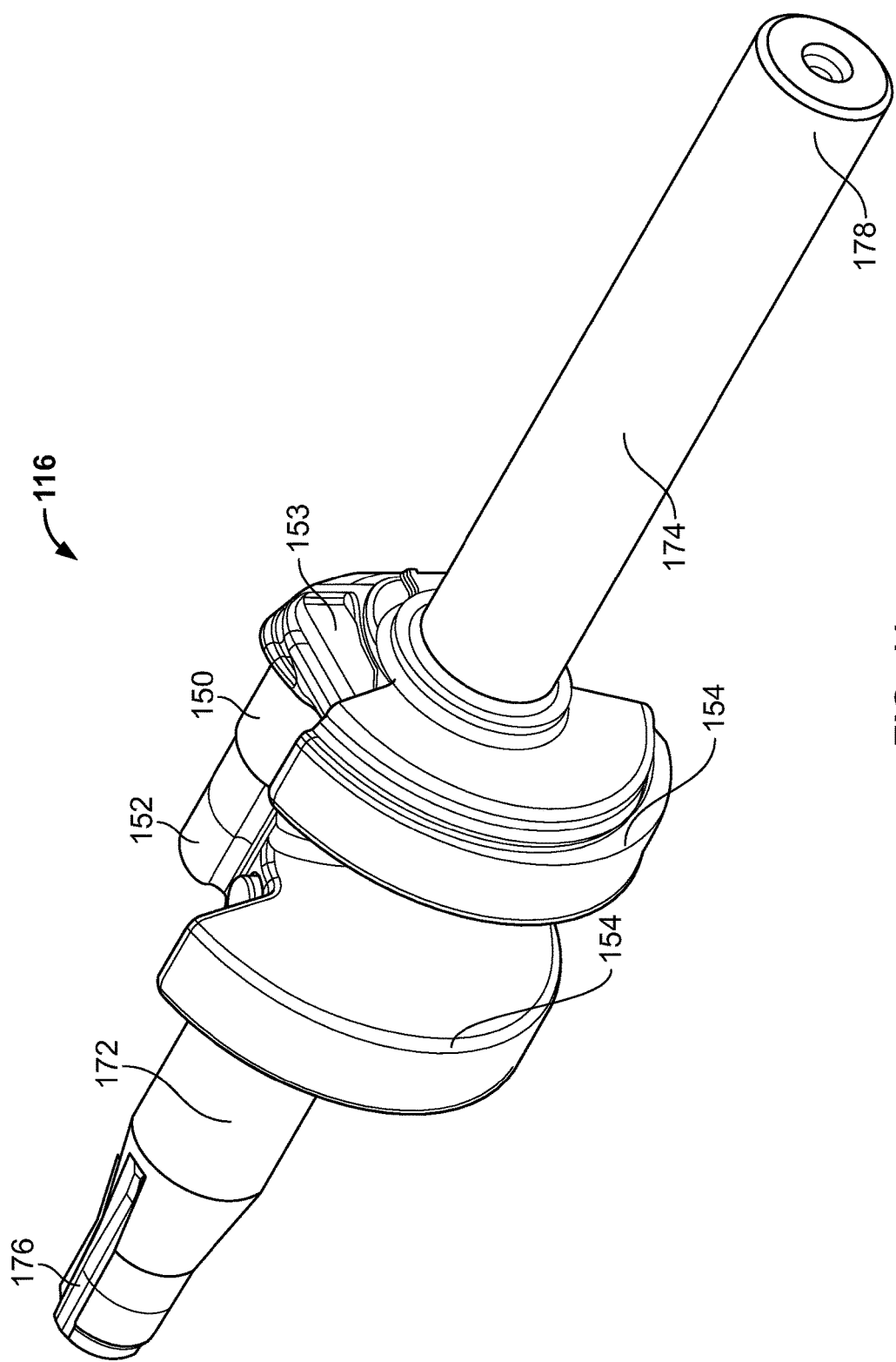
FIG. 11 is a perspective view of the crankshaft of FIG. 4.

Referring to FIGS. 11-13, the crankshaft 116 of the engine 110 of FIGS. 1-4 includes the journal 150, the webs 152, 153, the counterweights 154, and upper and lower main journals 172, 174. The upper main journal 172 tapers and includes a keyed slot 176 to connect to a flywheel and blower fan (not shown). According to an exemplary embodiment, the lower main journal 174 extends through the sump 114 of the engine 110 and includes a power takeoff 178, which may be connected to a driveshaft or other working component of outdoor power equipment. In other embodiments, the engine is horizontally-shafted and the power takeoff extends from a side of the engine.

According to an exemplary embodiment, the first and second webs 152, 153 of the crankshaft 116 are positioned on opposite sides of the journal 150. However, the first web 152 does not mirror the second web 153 about the journal 150. Put another way, the first and second webs 152, 153 are not symmetric reflections of one another about the journal 150. Instead, the first web 152, but not the second web 153, is configured to allow the bearing surface 160 and open portion 162 of the big end 148 of the connecting rod 138 to slide lengthwise along the crankshaft 116 over the first web 152 and onto the journal 150. The second web 153 is wider than the open portion 162, surrounded by the interior bearing surface 160 and defined by the C-shape of the big end 148 of the connecting rod 138, such that, unlike with the first web 152, the big end 148 of the connecting rod 138 cannot slide over the second web 153 and onto or off of the journal 150.

According to an exemplary embodiment, the crankshaft 116 is oriented such that the second web 153 is below the connecting rod 138 when the engine 110 is in the upright position, and the second web 153 limits downward movement of the connecting rod 138. In other contemplated embodiments, first and second webs mirror one another and the connecting rod 138 is configured to slide over either web and onto the journal 150. In such embodiments, the structure of the cylinder of the engine 110 and attachment to the pin 146 of the piston 118 (FIG. 4) limit downward movement of the connecting rod 138.

Figure 6:
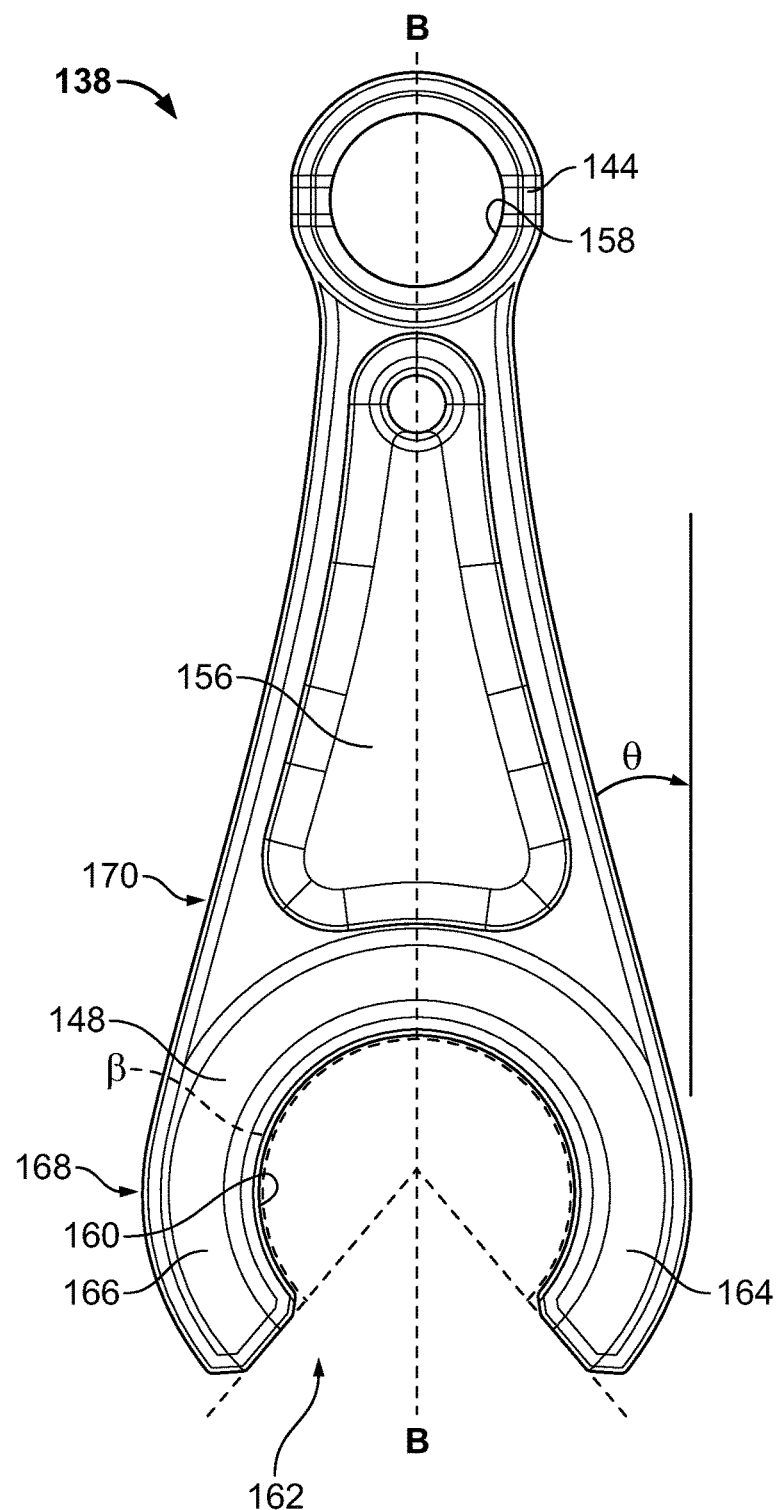
FIG. 6 is a side view of the connecting rod of FIG. 4.
Figure 7:
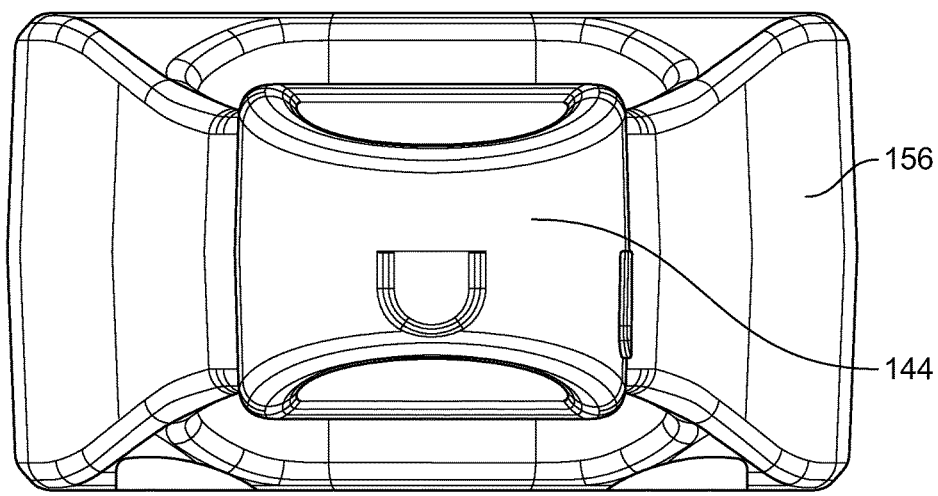
FIG. 7 is a top view of the connecting rod of FIG. 4.
Figure 8:
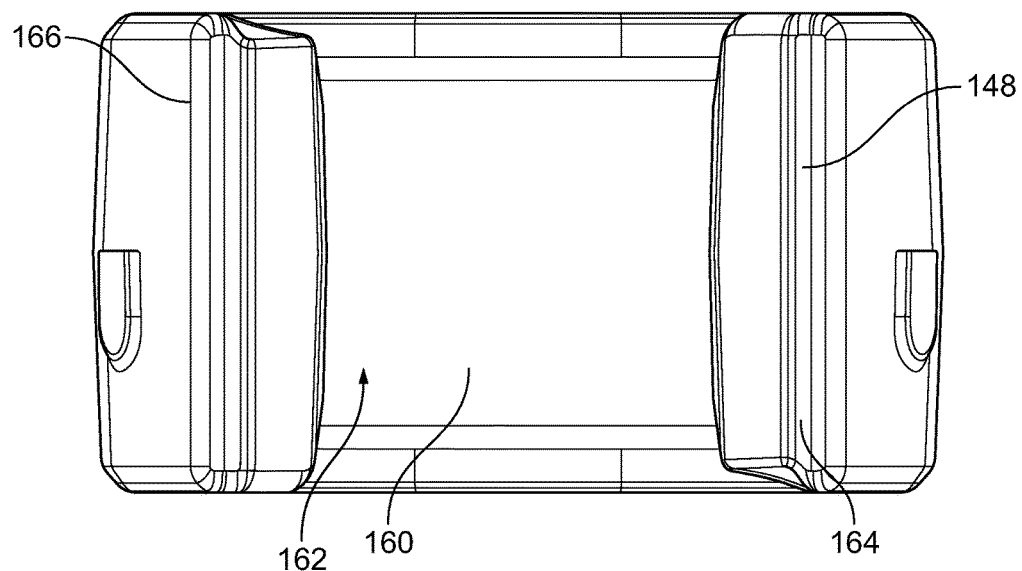
FIG. 8 is a bottom view of the connecting rod of FIG. 4.
Figure 14:
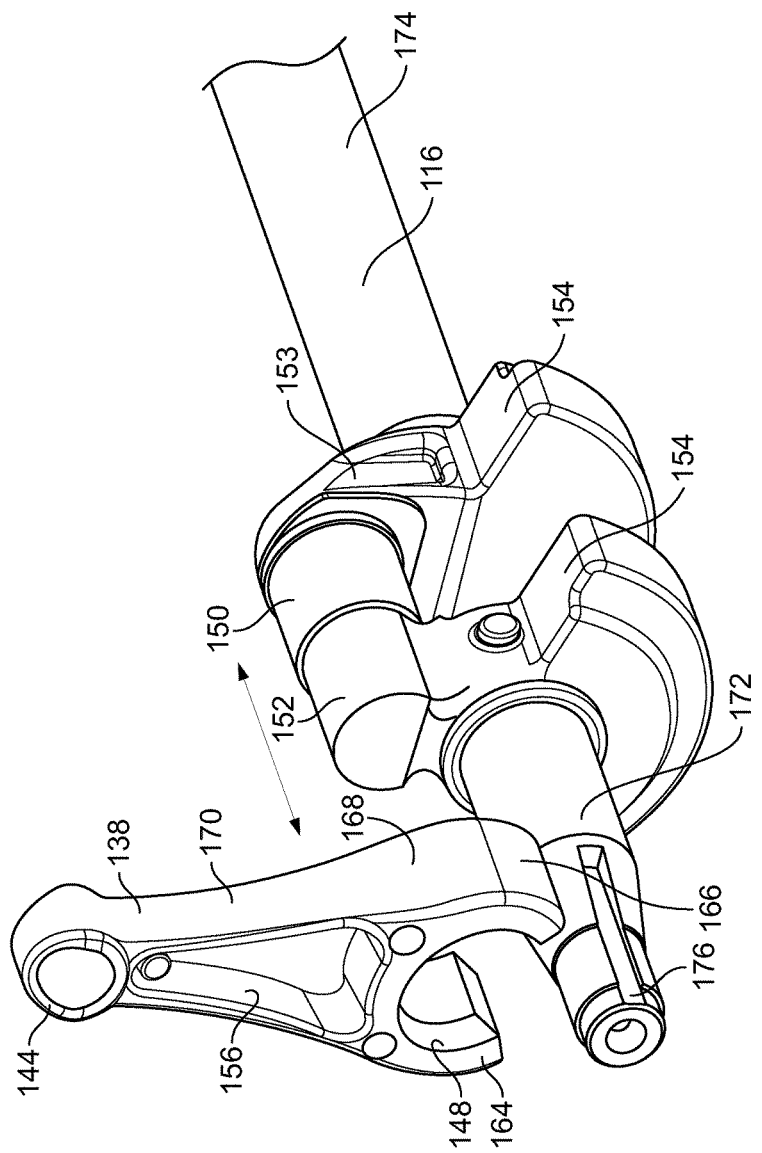
FIG. 14 is a perspective view of the connecting rod and the crankshaft of FIG. 4 in a first configuration.
Figure 15:
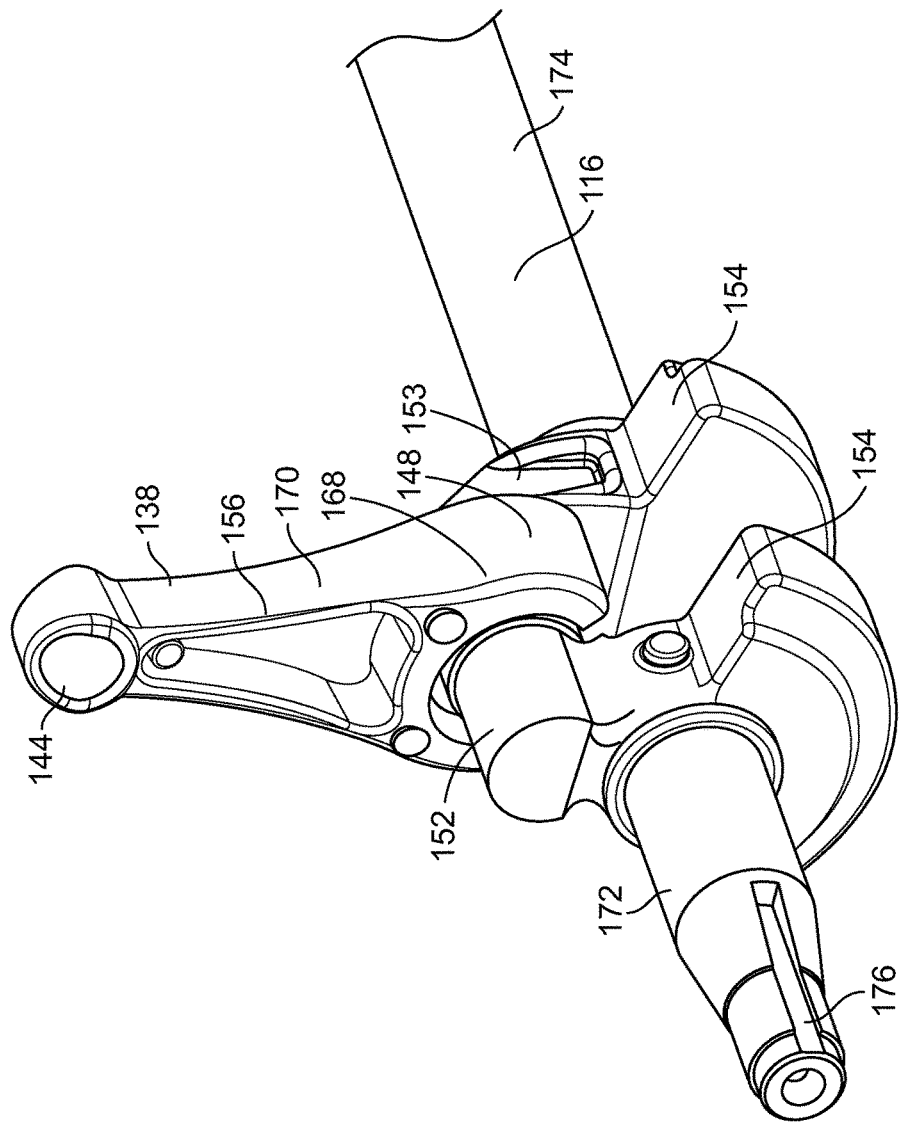
FIG. 15 is a perspective view of the connecting rod and the crankshaft of FIG. 4 in a second configuration.
Figure 16:
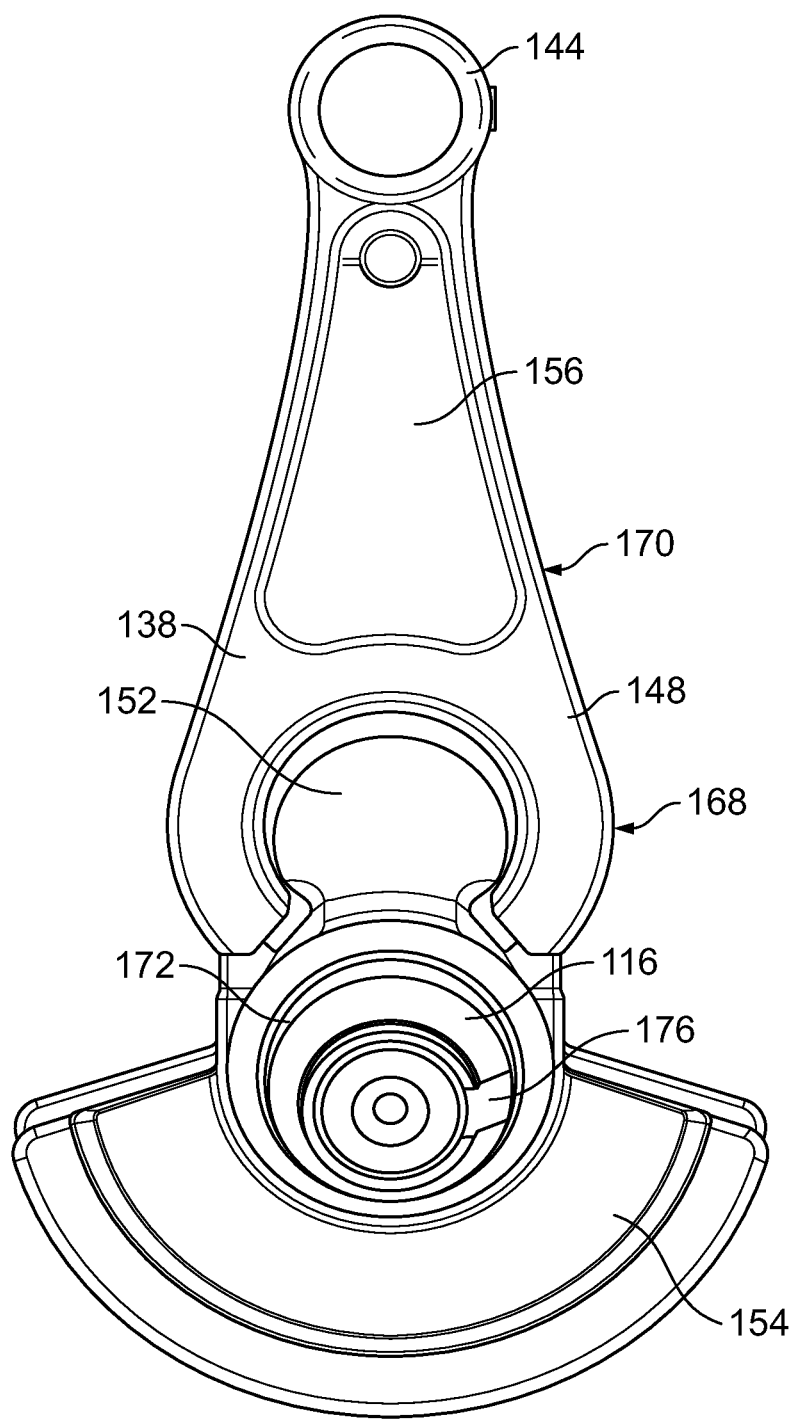
FIG. 16 is a side view of the connecting rod and the crankshaft of FIG. 4 in the second configuration.

Referring now to FIGS. 14-16, a method of assembling the internal combustion engine 110 includes sliding the C-shaped big end 148 of the connecting rod 138 longitudinally along the crankshaft 116 and over the first web 152 of the crankshaft 116, such that a portion of the first web 152 moves through the open portion 162 of the C-shaped big end 148 defined by the inside of the C-shape, as shown in FIG. 6. The method further includes sliding the bearing surface 160 of the big end 148 onto the cylindrical journal 150 adjoining the first web 152 of the crankshaft 116. The bearing surface 160 of the big end 148 extends around more than half of the perimeter of the journal 150 such that the big end 148 holds the connecting rod 138 to the journal 150 of the crankshaft 116 while allowing the crankshaft 116 to rotate with respect to the bearing surface 160.

According to an exemplary embodiment of the method, the crankshaft further includes the second web 153 adjoining the cylindrical journal 150, where the second web 153 is wider than the open portion 162 defined by the C-shape of the big end 148 of the connecting rod 138 such that the big end 148 cannot slide over the second web 153. In some such embodiments, the method further includes coupling the connecting rod 138 with the piston 118 and inserting the piston 118 into the cylinder connected to the engine block 112 of the internal combustion engine 110 (see FIGS. 1-4). The method still further includes inserting the power takeoff 178 of the crankshaft 116 through an opening in the sump 114 and fastening the sump 114 to the engine block 112. In some such embodiments, the crankshaft 116 is oriented with respect to the engine block 112 and the sump 114 such that the second web 153 is closer to the sump 114 than the first web 152 is to the sump 114.

Figure 17:
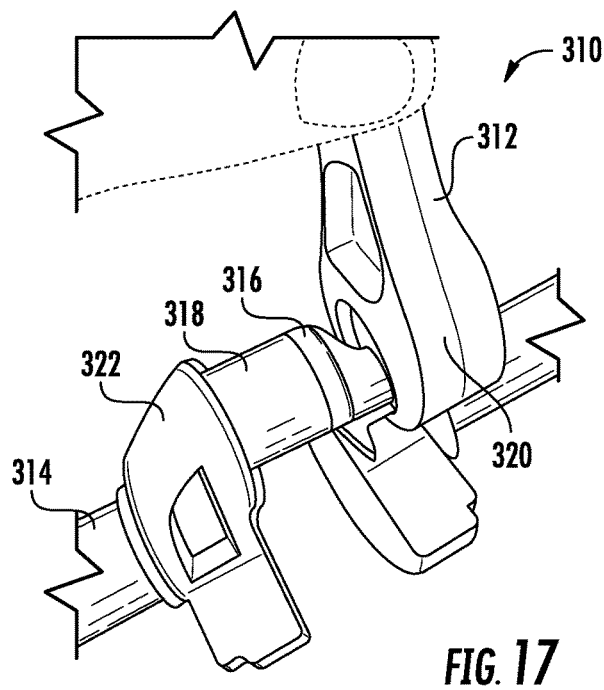
FIGS. 17-19 are digital images of a connecting rod being attached to a journal of a crankshaft according to an exemplary embodiment of the invention.
Figure 18:
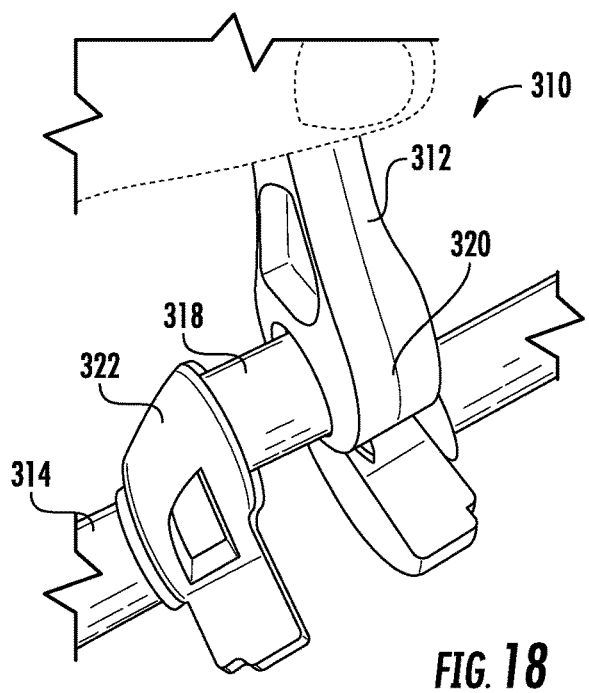
Figure 19:
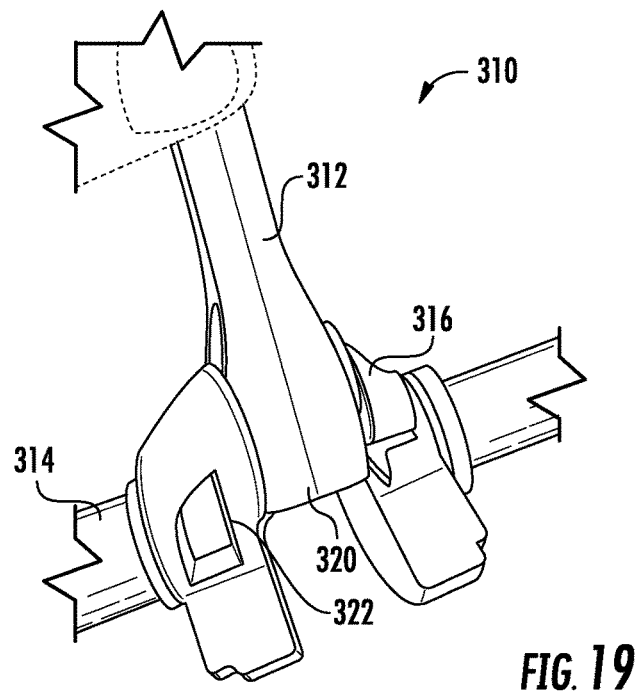
Figure 20:
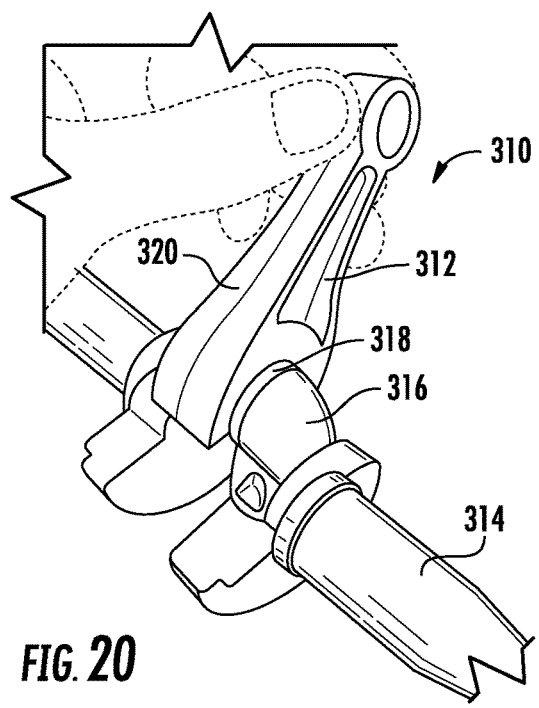
FIG. 20 is a digital image of the connecting rod attached to the journal of FIGS. 17-19.

Referring to FIGS. 17-20, a connecting rod system 310 for an engine includes a connecting rod 312 and a crankshaft 314 configured to be attached to one another by sliding the connecting rod 312 over a first web 316 of the crankshaft 314 and onto a crankpin journal 318 of the crankshaft 314. FIG. 17 shows the connecting rod 312 and the crankshaft 314 decoupled from one another. FIG. 18 shows a big end 320 of the connecting rod 312 sliding over the first web 316. FIG. 19 shows the connecting rod 312 positioned over the crankpin journal 318. A second web 322 of the crankshaft 314 blocks the big end 320 of the connecting rod 312 from being able to slide over second web 322. FIG. 20 shows that the connecting rod 312 is configured to allow the crankshaft 314 to rotate relative to the connecting rod 312 while the big end 320 of the connecting rod 312 holds the crankpin journal 318. Decoupling of the connecting rod 312 and crankshaft 314 is performed by reversing the above-described steps.

The construction and arrangements of the engine and connecting rod system, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, the connecting rod 138 may be used with a piston of a steam engine, a wind turbine, a piston pump, or devices other than engines. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. An internal combustion engine, comprising:
   a piston;
   a crankshaft rotatable about an axis of rotation, the crankshaft comprising:
      a journal;
      first and second webs positioned on opposite ends of the journal;
      a first counterweight positioned opposite the first web, wherein the first counterweight is wider than the first web;
      a second counterweight positioned opposite the second web, wherein the second counterweight is wider than the second web; and
      a main journal that includes the axis of rotation,
      wherein the first web and the second web each connect the journal to the main journal and space the journal apart from the main journal and the axis of rotation, and
      wherein the first web is narrower than the journal and the second web is wider than the journal; and
   a connecting rod, comprising:
      a first end coupled to the piston; and
      a second end coupled to the journal of the crankshaft, wherein the second end comprises a bearing surface configured to interface with the journal,
      wherein the second end comprises an open portion extending through the second end from the bearing surface to the exterior of the second end, and
      wherein the open portion of the second end of the connecting rod is located directly opposite to the first end of the connecting rod;
   wherein the first web is narrower than the open portion, and wherein the second web is wider than the open portion; and
   wherein the first web, but not the second web, is configured to allow the bearing surface and open portion of the second end of the connecting rod to slide lengthwise along the crankshaft over the first web and onto the journal.

2. The internal combustion engine of claim 1, wherein the second end is C-shaped.

3. The internal combustion engine of claim 1, wherein the connecting rod is a single, continuous, integrally-formed piece.

4. The internal combustion engine of claim 3, wherein the connecting rod is formed from die cast metal.

5. The internal combustion engine of claim 1, wherein the second end of the connecting rod does not include a cap.

6. The internal combustion engine of claim 5, wherein the second end does not include a bolt hole.

7. The internal combustion engine of claim 1, wherein the bearing surface of the second end is round but does not form a complete, closed circle.

8. The internal combustion engine of claim 7, wherein the bearing surface defines a circular arc of greater than 180-degrees.

9. The internal combustion engine of claim 8, wherein the bearing surface defines a circular arc of greater than 225-degrees.

10. The internal combustion engine of claim 9, wherein the bearing surface defines a circular arc of less than 315-degrees.

11. An internal combustion engine, comprising:
    a piston;
    a crankshaft rotatable about an axis of rotation, the crankshaft comprising:
       a journal;
       first and second webs positioned on opposite ends of the journal;
       a first counterweight positioned opposite the first web, wherein the first counterweight is wider than the first web;
       a second counterweight positioned opposite the second web, wherein the second counterweight is wider than the second web; and
       a main journal that includes the axis of rotation,
       wherein the first web and the second web each connect the journal to the main journal and space the journal apart from the main journal and the axis of rotation, and
       wherein the first and second webs do not mirror one another about the journal; and
    a connecting rod, comprising:
       a first end coupled to the piston; and
       a second end coupled to the journal of the crankshaft, wherein the second end comprises a bearing surface configured to interface with the journal,
       wherein the second end comprises an open portion extending through the second end from the bearing surface to the exterior of the second end, and
       wherein the open portion of the second end of the connecting rod is located directly opposite to the first end of the connecting rod;
    wherein the first web, but not the second web, is configured to allow the bearing surface and open portion of the second end of the connecting rod to slide lengthwise along the crankshaft over the first web and onto the journal.

12. The internal combustion engine of claim 11, wherein the second end is C-shaped.

13. The internal combustion engine of claim 11, wherein the connecting rod is a single, continuous, integrally-formed piece.

14. The internal combustion engine of claim 13, wherein the connecting rod is formed from die cast metal.

15. The internal combustion engine of claim 11, wherein the second end of the connecting rod does not include a cap.

16. The internal combustion engine of claim 15, wherein the second end does not include a bolt hole.

17. The internal combustion engine of claim 11, wherein the bearing surface of the second end is round but does not form a complete, closed circle.

18. The internal combustion engine of claim 17, wherein the bearing surface defines a circular arc of greater than 180-degrees.

19. The internal combustion engine of claim 18, wherein the bearing surface defines a circular arc of greater than 225-degrees.

20. The internal combustion engine of claim 19, wherein the bearing surface defines a circular arc of less than 315-degrees.

* * * * *